US009401889B2

(12) United States Patent
Andrews

(10) Patent No.: US 9,401,889 B2
(45) Date of Patent: Jul. 26, 2016

(54) PORT-BASED DYNAMIC NETWORK PARAMETER ASSIGNMENT

(71) Applicant: Allied Telesis Holdings Kabushiki Kaisha, Tokyo (JP)

(72) Inventor: Keith Michael Andrews, San Jose, CA (US)

(73) Assignee: Allied Telesis Holdings Kabushiki, Tokyo (JP)

( * ) Notice: Subject to any disclaimer, the term of this patent is extended or adjusted under 35 U.S.C. 154(b) by 262 days.

(21) Appl. No.: 14/170,091

(22) Filed: Jan. 31, 2014

(65) Prior Publication Data

US 2015/0222592 A1 Aug. 6, 2015

(51) Int. Cl.
*G06F 15/177* (2006.01)
*H04L 29/12* (2006.01)
*H04L 12/26* (2006.01)

(52) U.S. Cl.
CPC ............ *H04L 61/2015* (2013.01); *H04L 43/08* (2013.01); *H04L 61/103* (2013.01)

(58) Field of Classification Search
None
See application file for complete search history.

(56) References Cited

U.S. PATENT DOCUMENTS

| 6,539,019 | B1* | 3/2003 | Noy | H04L 12/5601 370/395.53 |
| 7,778,203 | B2* | 8/2010 | Zhao | H04L 29/12811 370/254 |
| 8,570,872 | B2 | 10/2013 | Wiley et al. | |
| 8,619,552 | B2 | 12/2013 | Cheung et al. | |
| 8,656,026 | B1* | 2/2014 | Prasad | H04L 67/22 709/217 |
| 2007/0266163 | A1* | 11/2007 | Xiong | H04L 12/5835 709/228 |
| 2007/0288613 | A1* | 12/2007 | Sudame | H04L 41/12 709/223 |
| 2013/0148654 | A1 | 6/2013 | Sayani et al. | |
| 2013/0343527 | A1* | 12/2013 | Tregenza Dancer | H04M 3/2254 379/15.01 |

* cited by examiner

*Primary Examiner* — Brian P Whipple
(74) *Attorney, Agent, or Firm* — Brooks Acordia IP Law, PC; Michael Zarrabian

(57) ABSTRACT

Systems, apparatus and methods described herein are configured to dynamically assign network parameters based on a location (e.g., port) of a network parameter associated with a requesting device. In some embodiments, the systems, apparatus and methods described herein are further configured to facilitate network parameter assignment by an external network parameter assignment server based on the location (e.g., port) where a network parameter of requesting device is coupled.

6 Claims, 7 Drawing Sheets

US 9,401,889 B2

PORT-BASED DYNAMIC NETWORK PARAMETER ASSIGNMENT

BACKGROUND

Dynamic Host Configuration Protocol (DHCP) is a protocol used to automate network parameter assignment to network devices from one or more DHCP servers. DHCP allocation of Internet Protocol (IP) addresses operates on a client/server model in which the server assigns reusable IP information from an address pool to the client. A DHCP client might receive offer messages from multiple DHCP servers and may accept any one of the offers. Typically, the client usually accepts the first offer it receives.

Currently, specific network parameters are assigned based on a MAC address or other attribute within the DHCP packet and not the physical location of the client. In other words, conventional DHCP is not capable of assigning network parameters based on the physical location of a device.

SUMMARY

Accordingly, a need has arisen for a solution to assign network parameters based on the physical location of a device. Further, there is a need to assign the IP address based on the physical network port where the device is connected.

Embodiments are configured to dynamically assign specific network parameters to a device based on the device's physical port location. Embodiments may include a network device (e.g., switch, router, wireless access point) with an internal dynamic network parameter assignment module (e.g., DHCP server) that is configured to assign individual network parameters or ranges of network parameters on a per port basis. Embodiments may further be configured to facilitate dynamic assignment of network parameters based on the location (e.g., port) where a device is coupled via an external dynamic network parameter assignment device (e.g., DHCP server). Accordingly, values associated with the network parameters may be obtained, e.g., by an administrator, and assigned based on where a device is physically connected (e.g., port) regardless of its MAC address. Embodiments further allow a user (e.g., an administrator) to provision the desired network parameters to be associated with a requesting device based on the physical port where the requesting device is connected, instead of the MAC address or other special option that are within the users (e.g., administrator's) request (e.g., through manual entry).

One embodiment is directed to a method for network parameter assignment. The method includes receiving, at a port of an electronic system, a network parameter request from a client device and identifying the port associated with the electronic system where the network parameter request was received. In some embodiments, the network parameter request is a Dynamic Host Configuration Protocol (DHCP) discover packet. In some embodiments, the identifying of the port is based on a forwarding database (FDB). In some embodiments, the identifying of the port is based on a MAC address of the client device that sent the network parameter request. The method may further include modifying the network parameter request with an indicator that corresponds to the port of the electronic system.

The method further includes accessing a network parameter configuration data store and selecting a network parameter assignment from the network parameter configuration data store based on the port where the network parameter request was received. In some embodiments, the network parameter assignment configuration data store includes a port policy. In some embodiments, the network parameter assignment data store includes a range of IP addresses associated with the port. The network parameter assignment may then be sent.

Another embodiment is directed to a method for network parameter assignment. The method includes receiving, at a port of an electronic system, a network parameter request from a client device. In some embodiments, the network parameter request is a Dynamic Host Configuration Protocol (DHCP) discover packet. In some embodiments, the network parameter request includes an identifier associated with the client device. In some embodiments, the identifier associated with the client device includes a MAC address associated with the client device. The method further includes modifying the network parameter request to form a modified network parameter request and sending the modified network parameter request to a network parameter assignment device. In some embodiments, the modified network parameter request includes an indicator that is configured to identify the port of the electronic system where the network parameter request was received. The method further includes receiving a network parameter assignment based on the port of the electronic system where the network parameter request was received.

In some embodiments, the modifying includes replacing the identifier associated with the client device with a virtual identifier, and the method may further include modifying the network parameter assignment based on the identifier associated with the client device sending the network parameter request to form a modified network parameter assignment and sending the modified network parameter assignment. In some embodiments, the virtual identifier includes a virtual MAC address. In some embodiments, the virtual identifier includes a virtual MAC address of a network device that received the network parameter request.

Another embodiment is directed to a non-transitory computer-readable storage medium having stored thereon, computer executable instructions that, if executed by a device, causes the device to perform a method. The method includes receiving a network parameter request and accessing a network parameter assignment configuration data store. In some embodiments, the network parameter request is a Dynamic Host Configuration Protocol (DHCP) discover packet. In some embodiments, the network parameter assignment data store comprises a range of Internet Protocol (IP) addresses associated with the port.

The method further includes selecting a network parameter assignment from the network parameter assignment configuration data store based on a port where the network parameter request was received. In some embodiments, the selected network parameter assignment comprises an Internet Protocol (IP) address associated with the port. In some embodiments, the port is identified based on a forwarding database (FDB). In some embodiments, the port is identified based on a MAC address of a requesting device that sent the network parameter request.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

DETAILED DESCRIPTION

Figure 1:
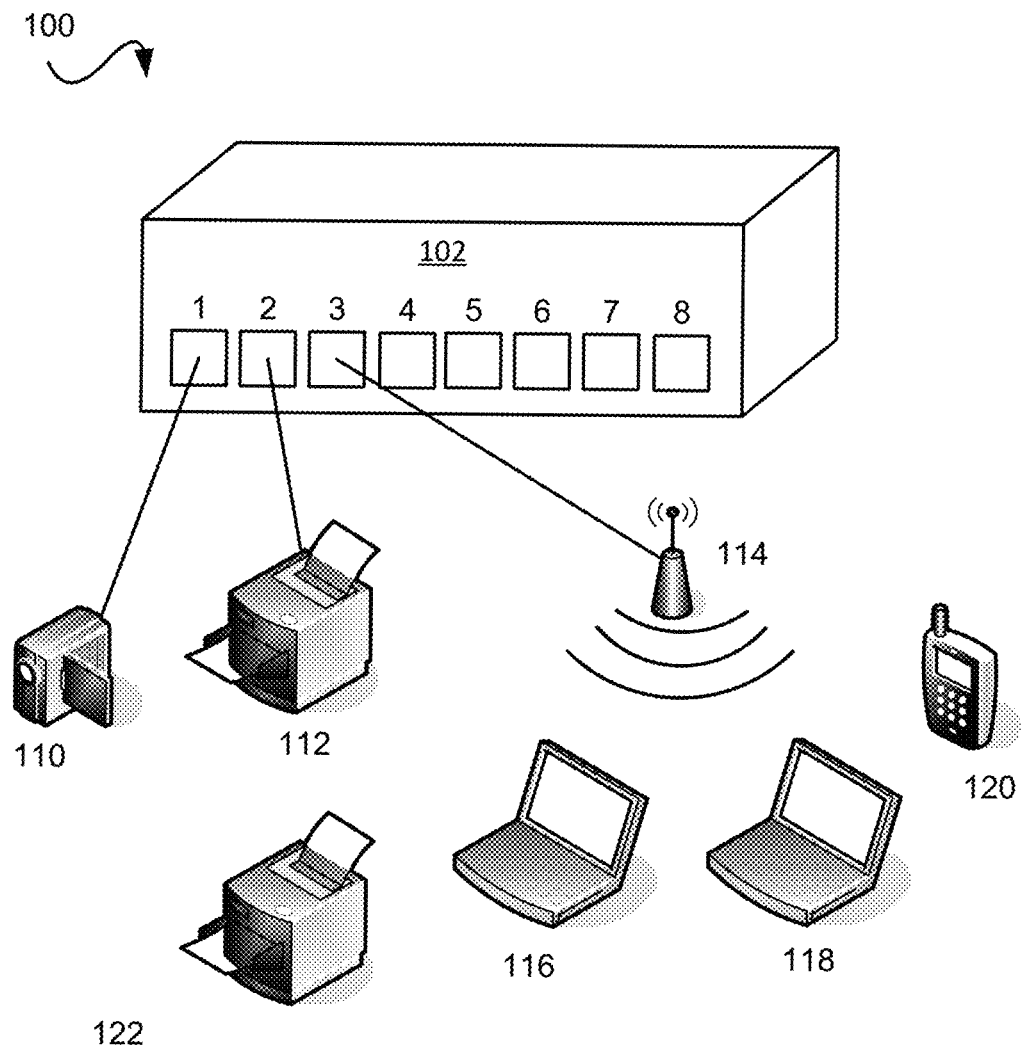
FIG. 1 shows an exemplary operating environment in accordance with one embodiment.

Reference will now be made in detail to various embodiments, examples of which are illustrated in the accompanying drawings. While the claimed embodiments will be described in conjunction with various embodiments, it will be understood that these various embodiments are not intended to limit the scope of the embodiments. On the contrary, the claimed embodiments are intended to cover alternatives, modifications, and equivalents, which may be included within the scope of the appended Claims. Furthermore, in the following detailed description of various embodiments, numerous specific details are set forth in order to provide a thorough understanding of the claimed embodiments. However, it will be evident to one of ordinary skill in the art that the claimed embodiments may be practiced without these specific details. In other instances, well known methods, procedures, components, and circuits have not been described in detail as not to unnecessarily obscure aspects of the claimed embodiments.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping," "modifying," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen for a solution to assign network parameters based on the physical location of a device. Further, there is a need to assign the Internet Protocol (IP) address based on the port where the device is connected. There is also a need to assign the host name based on the port where a device is connected.

DHCP servers may allocate IP addresses as well as host names and other parameters in three ways: dynamic allocation, automatic allocation, and static allocation. DHCP servers may be embedded within network devices or products including, but not limited to, wireless access points, routers, and switches. With dynamic allocation, a user (e.g., network administrator) may assign a range of IP addresses to be assigned via DHCP. Each client on the network is configured to request an IP address from the DHCP server during network initialization. The request-and-grant process uses a lease concept with a controllable time period, allowing the DHCP server to reclaim (and reallocate) IP addresses that are not renewed.

With automatic allocation, the DHCP server may permanently assign a free IP address to a requesting client from a range of IP addresses defined by a user (e.g., a network administrator). The DHCP server maintains a table of prior IP address assignments so that the DHCP server can assign the same IP address to a client that had previously assigned the same IP address.

With static allocation, the DHCP server allocates an IP address based on a table containing Media Access Control (MAC) address and IP address pairs. These MAC address and IP address pairs are manually entered. Only clients with a MAC address listed in the table will be allocated an IP address.

Embodiments are configured to dynamically assign specific network parameters to a device based on the device's physical port location (e.g., instead of the MAC address). Embodiments include a network device (e.g., switch, router, wireless access point) with an internal dynamic network parameter assignment module (e.g., DHCP server) that is configured to assign individual network parameters or ranges of network parameters on a per port basis. Embodiments may further be configured to facilitate dynamic assignment of network parameters based on the location (e.g., port) where a device is coupled via an external dynamic network parameter assignment device (e.g., DHCP server).

Embodiments further allow a client to be configured upon enabling a dynamic network parameter protocol (e.g., DHCP) on the client. The dynamic network parameter protocol may be enabled automatically or by default on the client. The enabling of the dynamic network parameter protocol on the client allows embodiments to assign network parameters to the client (e.g., IP address, host name, etc.) based on the physical location of the client (e.g., a port where the client is coupled to a network device). A client may thus be configured with network parameters by embodiments without enabling of special options or special configurations of the client.

The network parameters may include IP address, mask, gateway, and Domain Name System (DNS) server(s), host name, lease configuration, time offset, router, time server, name server, log server, cookie server, lineprinter (LPR) server, Impress server, Resource Location server, host name, boot file size, merit dump file, domain name, swap server, root path, extensions path, etc. Embodiments allow a user (e.g., an administrator) to know what network parameters are assigned based on where a device is physically connected (e.g., port) regardless of its MAC address. Embodiments further allow a user (e.g., an administrator) to provision desired network parameters he or she wants a requesting device to receive based on the physical port where the requesting device is connected, instead of the MAC address or other special option that are within the user's (e.g., administrator's) request (e.g., through manual entry). Embodiments are configured to operate with any dynamic network parameter or configuration protocol including, but not limited to, Link Layer Discovery Protocol (LLDP) and Dynamic Host Configuration Protocol (DHCP). Embodiments thus provide flexibility and ease in deploying and managing edge devices.

FIG. 1 shows an exemplary operating environment in accordance with one embodiment. Exemplary operating environment 100 includes network device 102, camera 110, printer 112, access point 114, and printer 122 (e.g., a replacement printer). Access point 114 may further couple mobile devices 116 and 118 and smartphone 120 to network device 102. Network device 102 may be any of a plurality of devices configured to facilitate network communication. For example, network device 102 may be a hub, a switch, a router, a wireless router, a wireless access point, etc. In one exemplary embodiment, the network device 102 has eight ports configured for coupling various devices (e.g., camera 110, printer 112, and access point 114) (e.g., via Ethernet, fiber optics, power-line networking, etc.).

Before proceeding to further describe the various components of operating environment 100, it is appreciated that devices 110, 112, 114, 116, 118, 120, and 122 are exemplary and are not intended to limit the scope of the embodiments. For example, operating environment 100 may include other devices, such as workstations, modems, printers, bridges, hubs, voice over internet protocol (IP) telephones, IP video cameras, computer hosts and other devices to name a few.

As show in FIG. 1, camera 110 is coupled to port 1 of network device 102 and printer 112 is coupled to port 2 of network device 102. Access point 114 is coupled to port 3 of network device 102. Network device 102 may further be coupled to other networks (e.g., intranets, the Internet, etc.), other networking devices, and computing systems, electronic systems, etc. (not shown).

Each of camera 110, printer 112, and access point 114 may request network parameters from network device 102. For example, each of camera 110, printer 112, and access point 114 may send DHCP discover packets to network device 102 in order to receive network parameters (e.g., IP address, mask, gateways, DNS server(s), host name, etc.). The network parameters assigned by network device 102 thereby allow camera 110, printer 112, and access point 114 to communicate with each other and other devices coupled to network device 102.

In some embodiments, network device 102 is configured to assign network parameters to camera 110, printer 112, and access point 114 based on their respective port where each of camera 110, printer 112, and access point 114 are coupled thereto. For example, network device 102 may be configured to assign IP address 192.168.1.1 to a device coupled to port 1 (e.g., camera 110) and assign IP addresses 192.168.1.2 to a device (e.g., printer 112) coupled to port 2. As another example, network device 102 may be further configured to assign the range of IP addresses 192.168.1.3 to 192.168.1.10 to devices coupled to a particular port (e.g., wireless access point 114, mobile computing devices 116-118, or smartphone 120).

Network device 102 is configured to assign network parameters based on the port where a device or devices are coupled, thereby improving administration and maintenance of a network. For example, assigning IP address 192.168.1.1 and host name of "PORT-1 DEVICE" to a device coupled to port 1 of network device 102 allows a user (e.g., an administrator) to know the physical location of the device and where the device is coupled to network device 102. Furthermore, device replacement is simplified. For example, if the printer 112 is coupled to port 2 of network device 102 and dynamically assigned IP address 192.168.1.2, when the printer 112 is replaced with the printer 122, the printer 122 will be dynamically assigned the same IP address of 192.168.1.2. This permits the printer 122 to be used with minimal or no configuration. Accordingly, device replacement boils down to a simple device swap without a need to reconfigure or to get a network administrator involved, thereby simplifying the process and reducing the cost associated with maintenance and administration of the network.

In some embodiments, a network parameter lease associated with a first device coupled to a particular port may be assigned to a second device that replaces the first device. For example, if a DHCP lease is associated with printer 112 and the printer 112 is replaced with the printer 122 and connected to the same port, the printer 122 will be assigned the DHCP lease that was assigned to the printer 112.

Referring to Table I, exemplary device configuration commands are shown. The commands shown include an exemplary prompt of "awplus(config)#" which may be presented or displayed to a user for entering commands and indicating a configuration mode. Line numbers have been added for description and exemplification purposes.

TABLE I

Exemplary configuration commands

1: awplus(config)# interface port1.0.1
2: awplus(config-if)# ip dhcp host offer 192.168.1.1
3: awplus(config)# interface port1.0.2
4: awplus(config-if)# ip dhcp host offer 192.168.1.2
5: awplus(config)# interface port1.0.3
6: awplus(config-if)# ip dhcp host offer 192.168.1.3-192.168.1.10

Line 1 is a command to enter a configuration mode for port 1 (port1.0.1). Line 2 is a command to configure a DHCP host to offer the IP address 192.168.1.1 to a device coupled to port 1. Line 3 is a command to enter a configuration mode for port 2 (port1.0.2). Line 4 is a command to configure a DHCP host to offer the IP address 192.168.1.2 to a device coupled to port 2. Line 5 is a command to enter a configuration mode for port 3 (port1.0.3). Line 6 is a command to configure a DHCP host to offer the IP address range 192.168.1.1 to 192.168.1.10 to the devices coupled to port 3.

Figure 2:
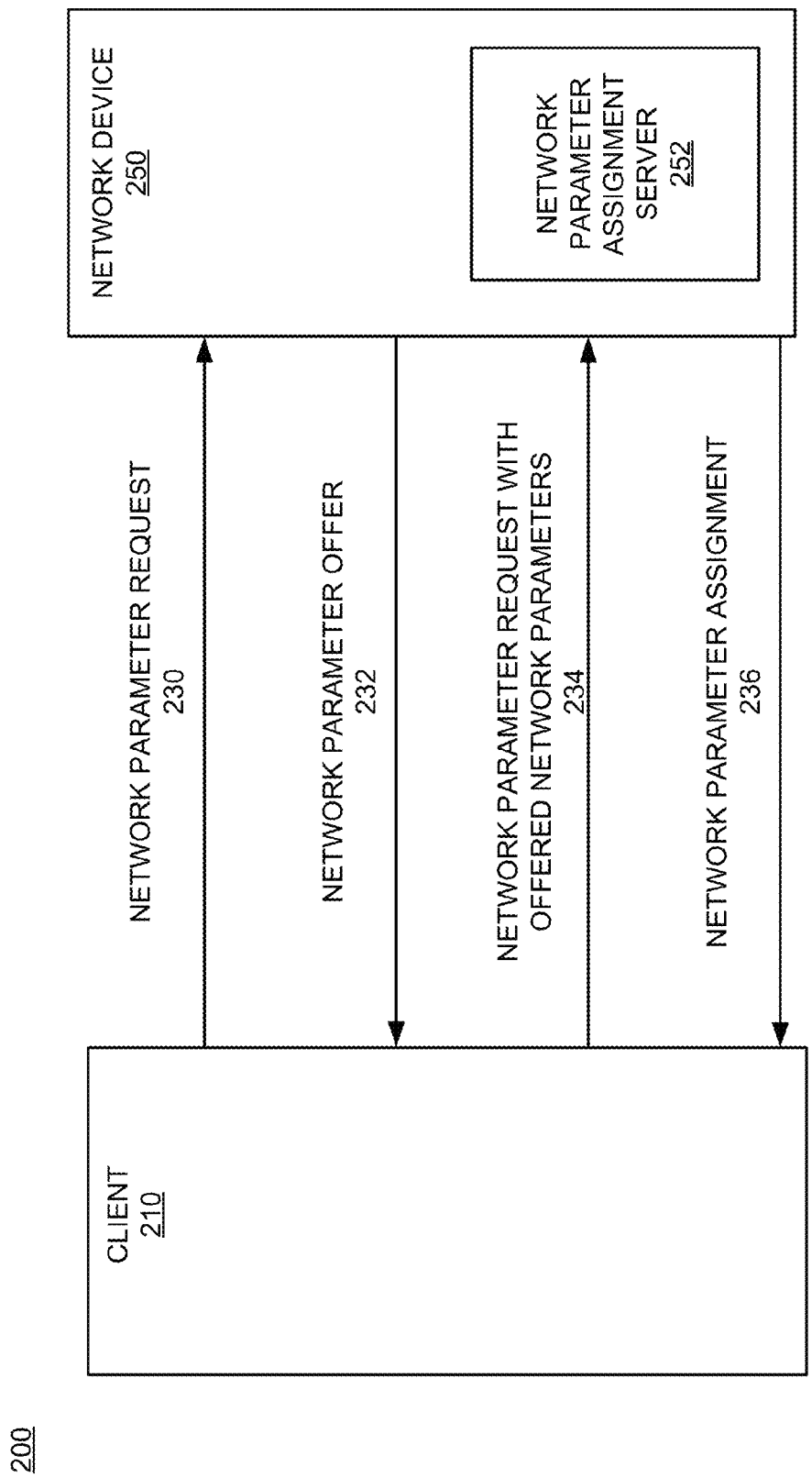
FIG. 2 shows an exemplary communication sequence between a client device and a network device in accordance with one embodiment.

FIG. 2 shows an exemplary communication sequence between a client device and a network device in accordance with one embodiment. FIG. 2 depicts an exemplary communication sequence 200 for assignment of network parameters. Exemplary communication sequence 200 shows communication between client 210 and network device 250. Client 210 may be a variety of computing or electronic devices, as described herein. Network device 250 may include network parameter assignment server 252.

In some embodiments, client 210 may transmit a network parameter request 230 to network device 250. A network parameter request 230 may be a request for network configuration information. The network configuration information may be used, by the client 210, to configure itself such that the client 210 can communicate with network device 250 and further communicate with on one or more networks coupled to network device 250. For example, network parameter request 230 may include a request for an IP address, DNS server(s), gateway, mask, etc. In some embodiments, the network parameter request 230 may be a broadcast packet or packets. In some embodiments, the network parameter request 230 is a DHCP discover packet.

A network parameter request 230 may be forwarded to the network parameter assignment server 252 for processing. The network parameter assignment server 252 may execute on a processor or other circuitry of network device 250. In some embodiments, the network parameter assignment server 252 is a DHCP server.

In some embodiments, the network parameter assignment server 252 (e.g., a DHCP server) is embedded within a network device (e.g., switch, router, etc.). The network parameter assignment server 252 may be configured to access (e.g., copy, intercept, etc.) a packet including a network parameter request (e.g., network parameter request 230).

In response to the network parameter request 230, the network parameter assignment server 252 may respond with a network parameter offer 232. A network parameter offer 232 may include network parameters associated with the network parameters requested by the client 210 in the network parameter request 230 (e.g., an IP address, etc.). In some embodiments, the network parameter offer 232 is a DHCP offer. In some embodiments, the network parameters associated with the physical port are offered to the requesting network device (e.g., client 210) via a network parameter offer 232 based on which port of network device 250 that a network parameter request 230 is received on and further based on the configuration or policy of network parameter assignment server 252. In some embodiments, the network device 250 sends information regarding the port that network parameter request 230 was received from, along with network parameter request 230 to network parameter assignment server 252.

In some embodiments, the network parameter request 230 (e.g., DHCP discover packet) is marked or tagged with the port of ingress. Based on the port of ingress and the network parameter configuration or policy, the network parameters associated with the physical port are offered to the requesting network device (e.g., client 210).

In some embodiments, a forwarding database (FDB) lookup is used to determine the port of ingress of a network parameter request 230 (e.g., DHCP discover packet). The forwarding database may include a mapping of the MAC addresses of each device coupled to network device 250 and the port where each device is coupled. Based on the port where the network parameter request 230 was received and a network parameter configuration data store, the network parameters associated with the physical port are offered to the requesting network device (e.g., client 210).

In some embodiments, the network parameter offer 232 may be replaced with a network parameter assignment from the network parameter assignment server 252, thereby enabling client 210 to configure itself for communication with network device 250 and one or more networks coupled to network device 250. The communication sequence may then terminate.

In some embodiments, in response to the network parameter offer 232, the client 210 may transmit a network parameter request with offered network parameters 234. A network parameter request with offered network parameters 234 may include the network parameters of the network parameter offer 232. For example, a network parameter request with offered network parameters 234 may include an IP address based on the port of network device 250 where the client 210 is coupled thereto. In some embodiments, a network parameter request with offered network parameters 234 may be a DHCP request.

In response to a network parameter request with offered network parameters 234, the network parameter assignment server 252 may transmit a network parameter assignment 236, thereby assigning network parameters to the client 210. In some embodiments, a network parameter assignment 236 may include an acknowledgement of the network parameters of the network parameter request with offered network parameters 234.

Figure 3:
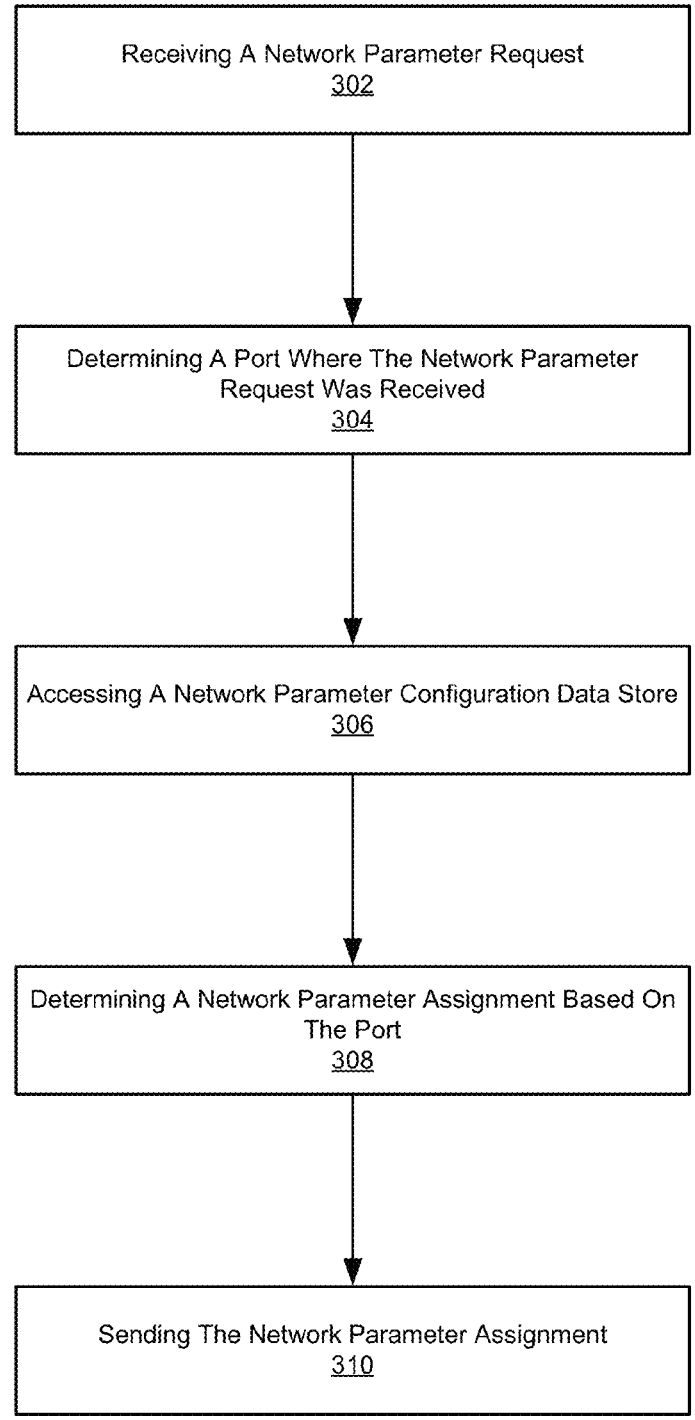
FIG. 3 shows an exemplary flow diagram of a process for assigning network parameters based on a location of a client device in accordance with one embodiment.

FIG. 3 shows an exemplary flow diagram of a process for assigning network parameters based on a location of a client device in accordance with one embodiment. In some embodiments, FIG. 3 depicts a process 300 for assigning network parameters based on the port where one or more devices are coupled to a network device (e.g., a network device 250). In some embodiments, process 300 may be performed by a network parameter assignment module or component (e.g., a DHCP server).

At block 302, a network parameter request is received from a requesting device (e.g., within an electronic system), as described herein. In some embodiments, the network parameter request is a DHCP discover packet.

At block 304, a port where the network parameter request was received, at the network device, is identified. In some embodiments, port information including the port where the network parameter request was received is added to the network parameter request or sent along with the network parameter request. In some embodiments, the port is determined using a forwarding database (FDB). The forwarding database may include a mapping of the MAC addresses of devices coupled to a network device and their respective ports where each device is coupled. In some embodiments, the port is determined based on the MAC address of a device that sent a network parameter request. In some embodiments, the port is determined based on an indicator of the port added to the network parameter request or the information passed along with the network parameter request that corresponds to the port that receives the network parameter request.

At block 306, a network parameter configuration data store is accessed. In some embodiments, the network parameter configuration comprises a port policy including data regarding which network parameters are to be assigned to devices coupled to each port of a network device. In some embodiments, the network parameter configuration data store comprises a range of IP addresses associated with a port.

At block 308, a network parameter assignment is determined based on the port where the network parameter request was received from and the network parameter configuration data store (e.g., including a mapping of network parameters to each respective port). For example, an IP address 192.168.1.1 may be assigned to a device coupled to port 1 and a range of IP addresses 192.168.1.5 to 192.168.1.15 may be assigned to devices coupled to port 3.

At block 310, the network parameter assignment is sent from the network device to the requesting device. The requesting device receiving the network parameter assignment may then configure itself for network communication based on the network parameter assignment.

Figure 4:
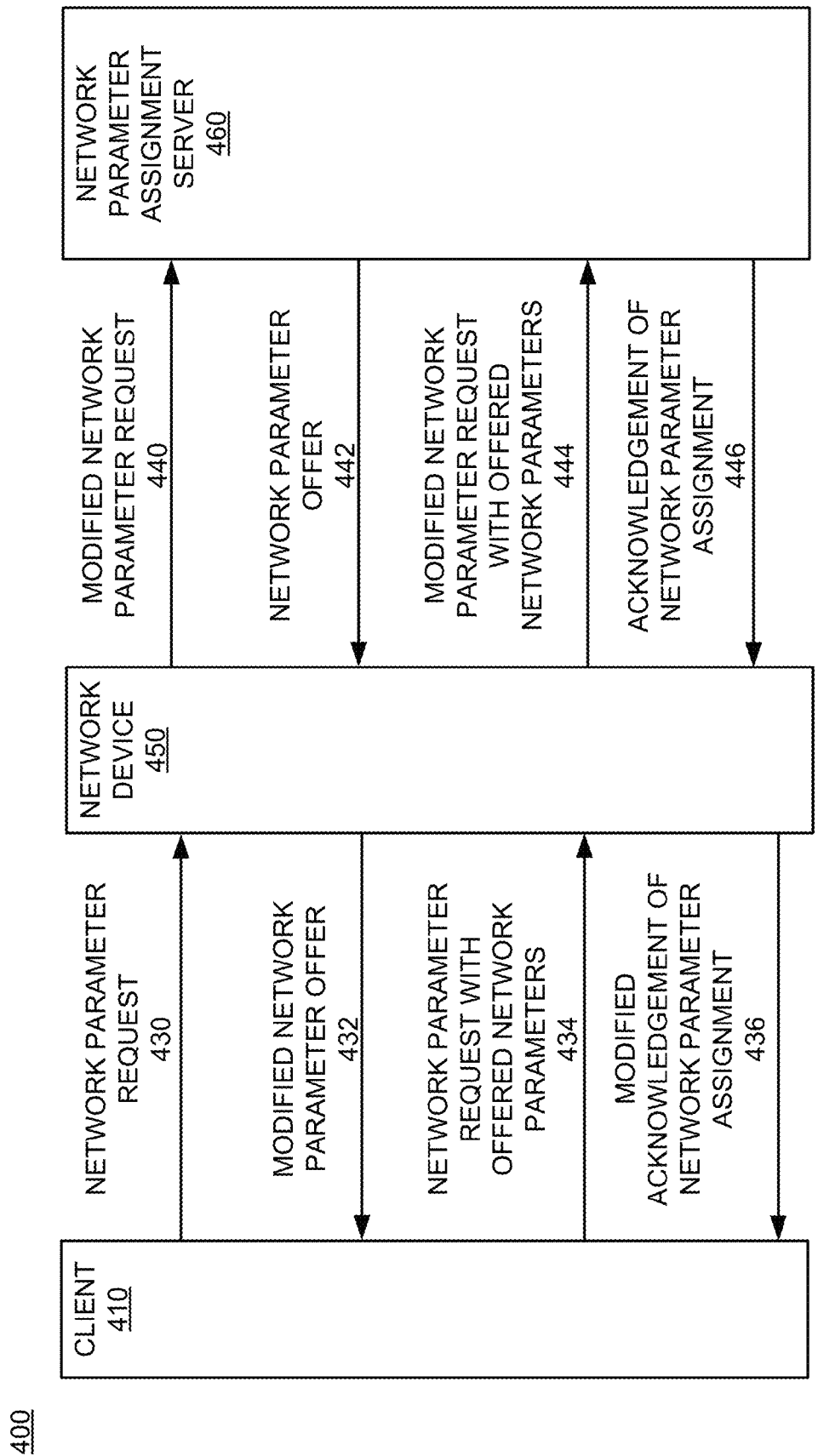
FIG. 4 shows an exemplary communication sequence between a client device, a network device, and a network parameter assignment device in accordance with one embodiment.

FIG. 4 shows an exemplary communication sequence between a client device, a network device, and a network parameter assignment device in accordance with one embodiment. FIG. 4 depicts an exemplary communication sequence 400 for assignment of network parameters. The exemplary communication sequence 400 shows the communication between a client 410, a network device 450, and a network parameter assignment server 460. Client 410 may be one of a variety of computing or electronic devices, as described herein. In some embodiments, the network parameter assignment server 460 may be a DHCP server.

In some embodiments, client 410 may transmit a network parameter request 430 to the network device 450. The network parameter request 430 may be a request for network configuration information so that the client 410 can be configured to communicate with a network device 450 and/or to communicate with one or more networks coupled to the network device 450. For example, a network parameter request 430 may include a request for an IP address, DNS server(s), gateway, mask, etc. In some embodiments, a network parameter request 430 is a broadcast packet or packets. In some embodiments, the network parameter request 430 is a DHCP discover packet. In some embodiments, the network parameter request 430 may include the MAC address of the client 410.

In response to the network parameter request 430, the network device 450 may send a modified network parameter request 440 to the network parameter assignment server 460. In some embodiments, the modified network parameter request 440 includes the virtual MAC address of the network device 450 in place of the MAC address of the client 410. The network device 450 may store the MAC address of the client 410 along with a mapping to the virtual MAC address of the network device 450. The virtual MAC address may be associated with a particular port of the network device 450.

In response to the modified network parameter request 440, the network parameter assignment server 460 may send a network parameter offer 442 to the network device 450. The network parameter offer 442 may include the virtual MAC address of a network device 450 that was part of a modified network parameter request 440. The network parameter offer 442 may further include the network parameters that are statically assigned (e.g., by a user, administrator, etc. of network parameter assignment server 460) to the virtual MAC address of the modified network parameter request 440. The network parameter offer 442 may thus include the network parameters to be assigned to a device coupled to a port of the network device 450, e.g., client 410, associated with the virtual MAC address of the network device 450.

The network device 450 may then modify network parameter offer 442 to replace the virtual MAC address of the network device 450 with the MAC address of the client 410. The network device 450 may then send a modified network parameter offer 432 with the MAC address of the client 410.

Client 410 may then send a network parameter request with offered network parameters 434 to the network device 450. Network parameter request with offered network parameters 434 may indicate that client 410 will configure itself based on the offered network parameters upon receiving acknowledgement of network parameter assignment. A network parameter request with offered network parameters 434 may include the MAC address of the client 410 and the network parameters of the network parameter offer 432. The network device 450 may then replace the MAC address of the client 410 in the network parameter request with the offered network parameters 434 with the virtual MAC address of the network device 450. The network device 450 may then send a modified network parameter request with the offered network parameters 444 with the virtual MAC address of network device 450 to the network parameter assignment server 460.

The network parameter assignment server 460 may then send an acknowledgement of the network parameter assignment 446 to the network device 450. An acknowledgement of a network parameter assignment 446 may include the virtual MAC address of the network device 450. The network device 450 may then replace the virtual MAC address of the network device 450 in an acknowledgement of the network parameter assignment 446 with the MAC address of client 410. The network device 450 may then send an acknowledgement of network parameter assignment 436 with the MAC address of client 410 to client 410, thereby assigning the network parameters to client 410.

Figure 5:
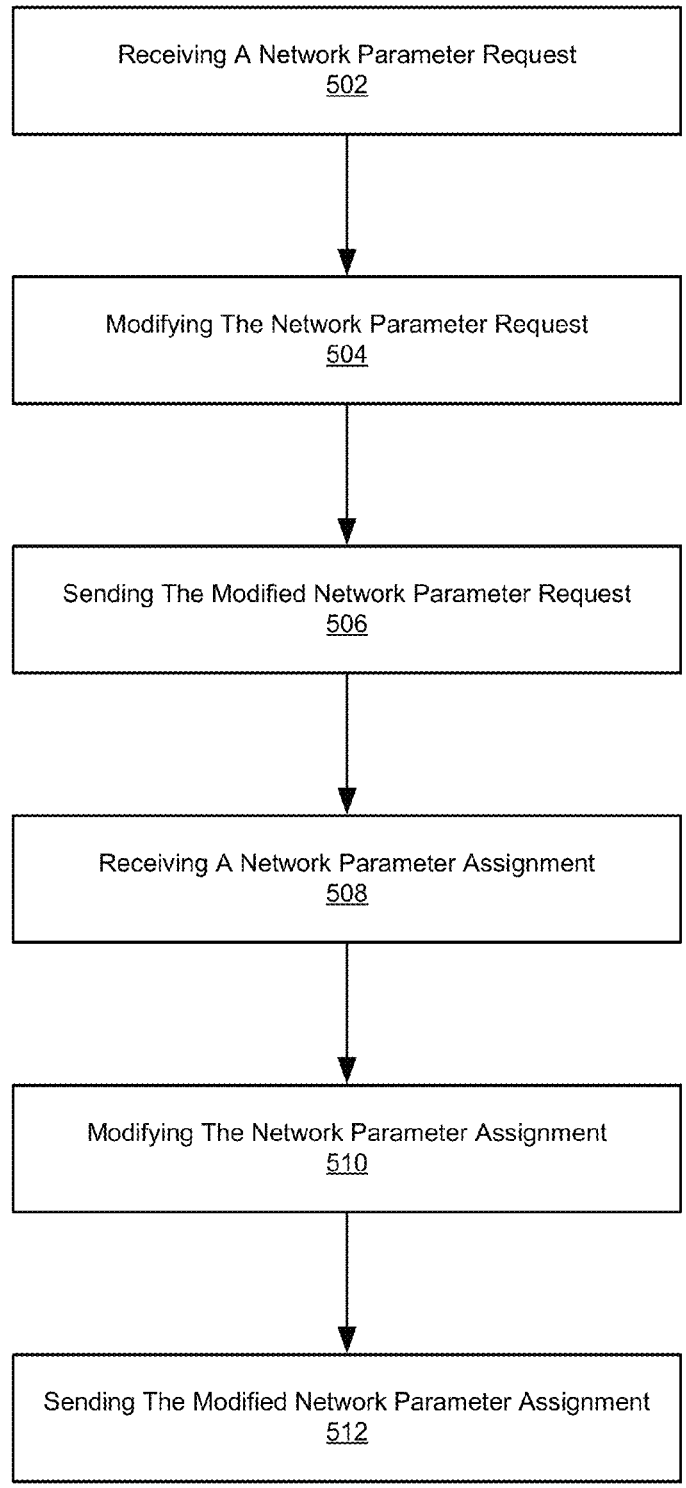
FIG. 5 shows an exemplary flow diagram of a process for assigning network parameters, based on a location of a client device, with an external dynamic network parameter assignment server in accordance with one embodiment.

FIG. 5 shows an exemplary flow diagram of a process for assigning network parameters, based on a location of a client device, with an external dynamic network parameter assignment server in accordance with one embodiment. In some embodiments, FIG. 5 depicts a process 500 for assigning network parameters based on the port where one or more devices are coupled to a network device (e.g., a network device 450), which is coupled to a network parameter assignment server (e.g., network parameter assignment server 460). In some embodiments, process 500 may be performed by a network device (e.g., network device 450) coupled to a network parameter assignment server (e.g., a DHCP server). It is appreciated that the process 500 may be performed by more than one network device and processed via a distributed system.

At block 502, a network parameter request is received (e.g., within an electronic system), from a client device. The network parameter request may include an identifier (e.g., MAC address) of the client device sending the network parameter request. In some embodiments, the network parameter request is a DHCP discover packet.

At block 504, the network parameter request is modified to produce a modified network parameter request. In some embodiments, the modifying comprises replacing the identifier associated with the client device with a virtual identifier. For example, the network parameter request is modified to replace an identifier (e.g., MAC address) of the client device (e.g., client 410) that sent the request with a virtual identifier (e.g., virtual MAC address) of the network device the received the request (e.g., network device 450).

In some embodiments, the modified network parameter request comprises an indicator associated with a receiving port of the network device where the network parameter request was received. The network device (e.g., network device 450) may insert an indicator (e.g., identifier, option, mark, tag) associated with the receiving port into a network parameter request received from a requesting client device. In some embodiments, the indicator may be inserted into a field (e.g., IP type of service (ToS), Virtual LAN (VLAN) ID, VLAN priority, Differentiated Services (DIFFserv), etc.) of the network parameter request. The indicator may be configured to identify the requesting client device or where the requesting device is physically located. For example, the indicator may indicate the receiving port of the network device where the requesting client device is coupled to the network device (e.g., network device 450). The network device may thus act as a relay agent for network parameter requests as the network parameter requests are sent to an external network parameter assignment server (e.g., DHCP server). The external network parameter assignment server may then assign network parameters based on the indicator and/or a network parameter assignment configuration or policy (e.g., a per port network parameter policy).

At block 506, the modified network parameter request is sent. In some embodiments, the modified network parameter request is sent from the network device to a network parameter assignment server (e.g., network parameter assignment server 460, a DHCP server, etc.).

At block 508, a network parameter assignment is received at the network device from the network parameter assignment server responsive to the transmission of the modified network parameter request. In some embodiments, the network parameter assignment is based on the receiving port of the network device where the network parameter request was received. The network parameter assignment may include the virtual identifier. For example, the virtual identifier (e.g., virtual MAC address) may be associated with the receiving port of the network device where the network parameter request was received. In some embodiments, the network parameter assignment is based on an indicator inserted into the network parameter request.

At block 510, the network parameter assignment is modified based on the identifier of the requesting client device, which sent the network parameter request. In some embodiments, the virtual identifier (e.g., virtual MAC address) is replaced with the identifier of the requesting client device (e.g., MAC address) that sent the network parameter request.

At block 512, the network parameter assignment is sent from the network device to the requesting client device. The network parameter assignment, including the identifier of the requesting client device that sent the network parameter request, may be sent to the requesting client device that sent the network parameter request, thereby allowing the device to configure itself for network communication.

Figure 6:
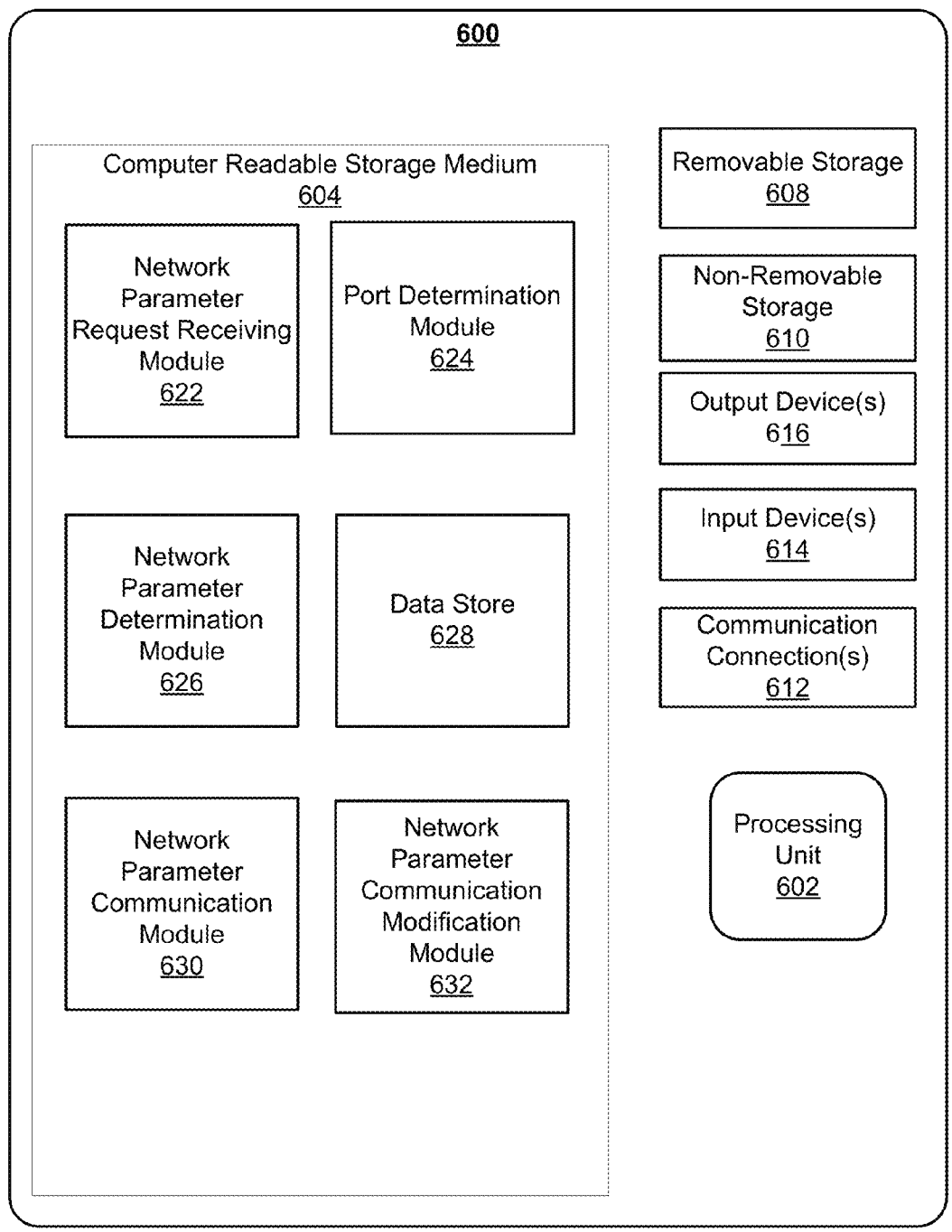
FIG. 6 shows a block diagram of an exemplary computer system in accordance with one embodiment.

Referring now to FIG. 6, a block diagram of an exemplary computer system in accordance with one embodiment is shown. With reference to FIG. 6, an exemplary system module for implementing embodiments disclosed herein, such as the embodiments described in FIGS. 1-5. In some embodiments, the system includes a general purpose computing system environment, such as computing system environment 600. Computing system environment 600 may include, but is not limited to, servers, switches, routers, desktop computers, laptops, tablets, mobile devices, and smartphones. In its most basic configuration, computing system environment 600 typically includes at least one processing unit 602 and computer readable storage medium 604. Depending on the exact configuration and type of computing system environment, computer readable storage medium 604 may be volatile (such as RAM), non-volatile (such as ROM, flash memory, etc.) or some combination of the two. Portions of computer readable storage medium 604 when executed facilitate configuring of devices according to embodiments described herein (e.g., processes 300 and 500).

Additionally in various embodiments, computing system environment 600 may also have other features/functionality. For example, computing system environment 600 may also include additional storage (removable and/or non-removable) including, but not limited to, magnetic or optical disks or tape. Such additional storage is illustrated by removable storage 608 and non-removable storage 610. Computer storage media includes volatile and nonvolatile, removable and non-removable media implemented in any method or technology for storage of information such as computer readable instructions, data structures, program modules or other data. Computer readable medium 604, removable storage 608 and non-removable storage 610 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 600. Any such computer storage media may be part of computing system environment 600.

In some embodiments, computing system environment 600 may also contain communications connection(s) 612 that allow it to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 612 may allow computing system environment 600 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 612 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 600 may also have input device(s) 614 such as keyboard, mouse, a terminal or terminal emulator (either directly connected or remotely accessible via telnet, SSH, HTTP, SSL, etc.), pen, voice input device, touch input device, remote control, etc. Output device(s) 616 such as a display, a terminal or terminal emulator (either directly connected or remotely accessible via telnet, SSH, HTTP, SSL, etc.), speakers, LEDs, etc. may also be included.

In one embodiment, computer readable storage medium 604 includes network parameter request receiving module 622, port determination module 624, network parameter determination module 626, data store 628, network parameter communication module 630, and network parameter communication modification module 632.

Network parameter request receiving module 622 is configured to receive network parameter requests from a client device, as described herein. In some embodiments, the network parameter request may include a DHCP discover packet. Network parameter request receiving module 622 may be configured to store information (e.g., MAC address, port, etc.) associated with the client device, which sent a network parameter request.

Port determination module 624 is configured to determine a port of a network device where a network parameter request was received, as described herein. In some embodiments, port determination module 624 is configured to determine the port based on a forwarding database, indicator, or tag of the network parameter request.

Network parameter determination module 626 is configured to determine network parameters based on the port of the network device where a network parameter request of the client device was received. Data store 628 is configured to store information for facilitating assignment of network parameters based on a port or physical location of a device, as described herein. In some embodiments, data store 628 may include a forwarding database, mapping of device identifiers (e.g., MAC addresses) and virtual identifiers (e.g., virtual MAC addresses), tags or indicators to be applied to incoming communications (e.g., network parameter requests) and configured for identifying a port where a network parameter was received.

Network parameter communication module 630 is operable to facilitate communications of network parameters from internal (e.g., embedded) or external network parameter assignment servers (e.g., device 460 or device 250), as described herein. Network parameter communication modification module 632 is configured to modify network parameter communications to facilitate assignment of network parameters based on a physical location of a device (e.g., port), as described herein (e.g., process 500). In some embodiments, network parameter communication modification module 632 may modify network parameter communications to include a virtual identifier (e.g., a virtual MAC address) or an indicator (e.g., of the port where a network parameter request was received).

Figure 7:
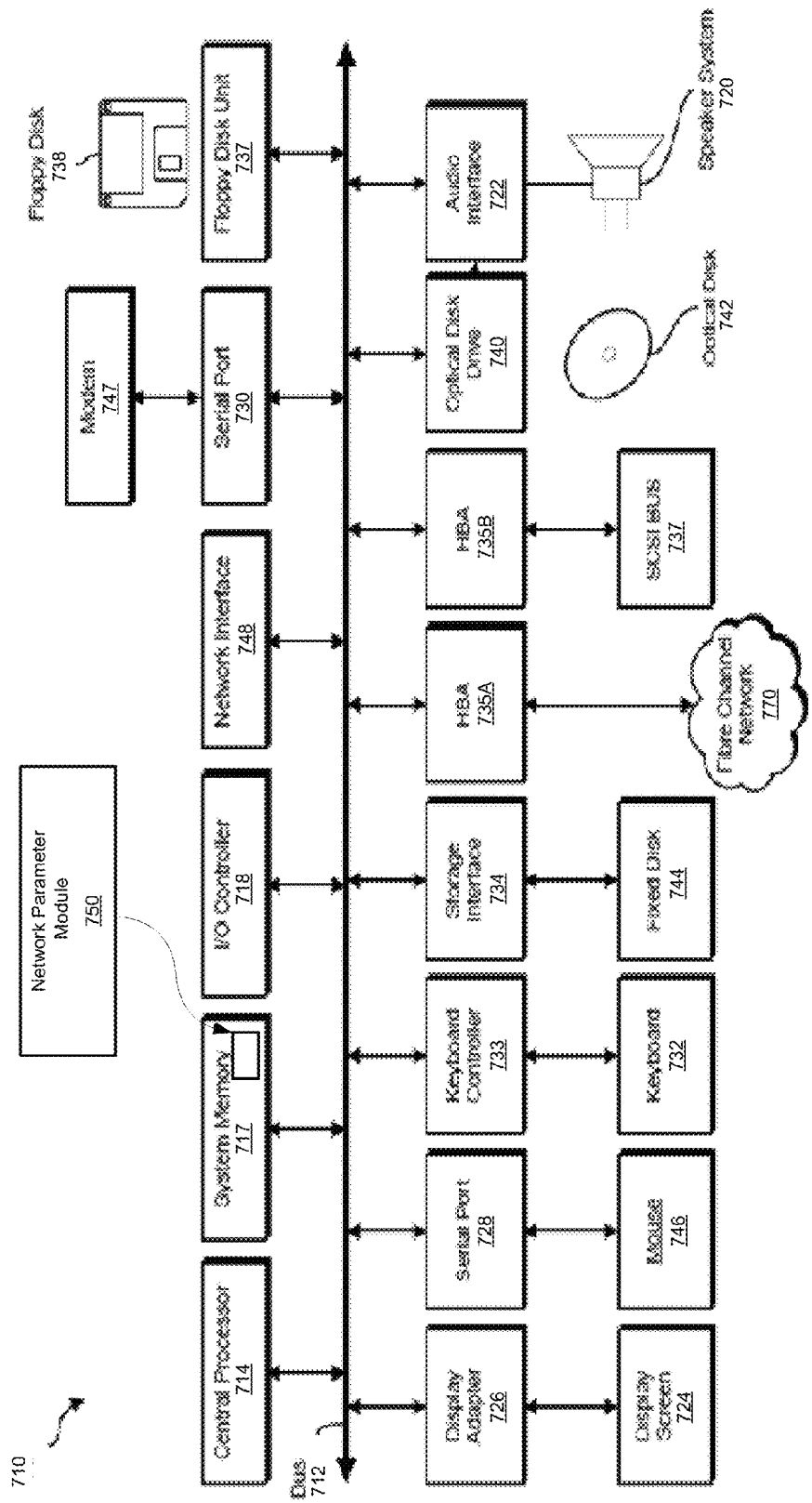
FIG. 7 shows a block diagram of another exemplary computer system in accordance with one embodiment.

Referring now to FIG. 7, a block diagram of another exemplary computer system in accordance with one embodiment is shown. FIG. 7 depicts a block diagram of a computer system 710 suitable for implementing the present disclosure. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a Small Computer System Interface (SCSI) bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

It is appreciated that the network interface 748 may include one or more Ethernet ports, wireless local area network (WLAN) interfaces, etc., but is not limited thereto. System memory 717 includes a network parameter module 750, which is operable for assigning network parameters based on a physical location (e.g., a port where a requesting device is coupled) of a device (e.g., process 300) or operable to facilitate assignment of network parameters by an external network parameter assignment server based on a physical location (e.g., a port where a requesting device is coupled) of a network parameter requesting device (e.g., process 500). According to one embodiment, the network parameter module 750 may include other modules for carrying out various tasks (e.g., modules of FIG. 6). It is appreciated that network parameter module 750 may be located anywhere in the system and is not limited to the system memory 717. As such, residing within the system memory 717 is merely exemplary and not intended to limit the scope of the embodiments. For example, parts of the network parameter module 750 may be located within the central processor 714 and/or the network interface 748 but are not limited thereto.

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Network interface 748 may provide multiple connections to networked devices. Furthermore, modem 747 may provide a direct connection to a remote server via a telephone link or to the Internet via an Internet service provider (ISP). Network interface 748 provides one or more connections to a data network, which may consist of any number of other network-connected devices. Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. A method comprising:
receiving, at a port of an electronic system, a network parameter request from a client device, wherein the network parameter request comprises an identifier associated with the client device;
modifying the network parameter request to form a modified network parameter request by replacing the identifier associated with the client device with a virtual identifier;
sending the modified network parameter request to a network parameter assignment device;
receiving a network parameter assignment based on the port of the electronic system where the network parameter request was received;
modifying the network parameter assignment based on the identifier associated with the client device sending the network parameter request to form a modified network parameter assignment; and
sending the modified network parameter assignment.

2. The method of claim 1, wherein the modified network parameter request comprises an indicator that is configured to identify the port of the electronic system where the network parameter request was received.

3. The method of claim 1, wherein the identifier associated with the client device comprises a MAC address associated with the client device.

4. The method of claim 1, wherein the virtual identifier comprises a virtual MAC address.

5. The method of claim 1, wherein the virtual identifier comprises a virtual MAC address of a network device that received the network parameter request.

6. The method of claim 1, wherein the network parameter request is a Dynamic Host Configuration Protocol (DHCP) discover packet.

* * * * *